United States Patent [19]

Tanaka et al.

[11] Patent Number: 5,020,097
[45] Date of Patent: May 28, 1991

[54] TELEPHONE WITH DATA SETTING BY REMOTE CONTROL

[75] Inventors: Shigeyasu Tanaka, Atsugi; Takaichi Furumura, Hadano, both of Japan

[73] Assignee: Anritsu Corporation, Tokyo, Japan

[21] Appl. No.: 435,947

[22] Filed: Nov. 13, 1989

[30] Foreign Application Priority Data

Nov. 18, 1988 [JP] Japan .................. 63-291874

[51] Int. Cl.$^5$ .......................................... H04M 11/00
[52] U.S. Cl. ..................................... 379/102; 379/93
[58] Field of Search .................. 379/102, 211, 93, 94, 379/96

[56] References Cited

U.S. PATENT DOCUMENTS

| | | | |
|---|---|---|---|
| 4,146,754 | 3/1979 | Rose | 379/102 |
| 4,206,444 | 6/1980 | Ferlan | 379/102 |
| 4,390,953 | 6/1983 | Johnstone | 379/102 |
| 4,475,009 | 10/1984 | Rais et al. | 379/211 |
| 4,670,628 | 6/1987 | Boratgis et al. | 379/211 |
| 4,720,853 | 1/1988 | Szlam | 379/211 |
| 4,754,479 | 6/1988 | Bicknell et al. | 379/211 |
| 4,755,985 | 7/1988 | Jayapalan et al. | 379/211 |

Primary Examiner—Jin F. Ng
Assistant Examiner—Stella L. Woo
Attorney, Agent, or Firm—Frishauf, Holtz, Goodman & Woodward

[57] ABSTRACT

A telephone that is capable of information processing using plural instruction codes. An instruction code discrimination circuit compares an instruction code received by an information receiving circuit with first and second instruction codes stored in an instruction code storage circuit to output a first control signal when the received instruction code corresponds to the first instruction code and a second control signal when the received instruction code corresponds to the second instruction code. An ID code discrimination circuit compares a received ID code with an ID code stored in an ID code storage circuit to provide an ID code coincidence signal when a coincidence occurs therebetween. A system control data storage circuit receives the first control signal and the ID code coincidence signal to store system control data. A parameter storage circuit receives the second control signal and the ID code coincidence signal to store parameter information.

16 Claims, 3 Drawing Sheets

| INSTRUCTION CODE A1 | ID CODE | NEW ID CODE | --- |

| INSTRUCTION CODE A2 | ID CODE | SYSTEM CONTROL DATA | --- |

| INSTRUCTION CODE B | ID CODE | PARAMETER | --- |

TELEPHONE WITH DATA SETTING BY REMOTE CONTROL

BACKGROUND OF THE INVENTION

1. Field of the Invention

The present invention relates to a telephone and a remote control system therefor and, more particularly, to a public or pay telephone and a remote control system therefor for remotely setting and updating control data and ID codes in the telephone using plural instruction codes.

2. Description of the Related Art

For example, with pay telephones, it is required to update various kinds of information on telephone tariff rate, coin denomination and so on for all the pay telephones each time the telephone tariff rate is revised or the coin denomination is altered.

In published unexamined Japanese patent application No. 62-1352 assigned to the same assignee as the present application, there is disclosed a method for updating parameter information easily and surely. That is, the pay telephone has the following functions: 1) receiving an ID code and new parameter information transmitted over a telephone line from a central office (pay-telephone managing equipment); and 2) making a comparison between the ID code and a code inherent in the pay telephone to replace old parameter information with the new parameter information when a coincidence occurs.

Furthermore, a pay telephone needs various pieces of control data for the telephone as well as parameter information about telephone tariff rate and the like.

For example, where abnormality occurs in a pay telephone, a managing equipment in charge of the telephone is automatically dialed to be informed of the abnormality. In such a case, a dial number of the managing equipment and other control data are needed. Furthermore, a third person may find the ID code inherent in the pay telephone and alter parameter information to make unlawful telephone calls. To prevent this, the ID code has to be changed immediately.

Conventionally, such setting or changing of the control data and ID code was performed at the time of installation of the pay telephone or by opening the telephone after the installation thereof. However, problems may arise in that mistakes in setting the control data and ID code and telephone failure caused by erroneous operation are liable to occur at the time of installation of the telephone. For alteration of the ID code after the installation of the telephone, an authorized worker has to go to the place at which the telephone is installed only for that purpose. Thus, workers and cost therefor were required.

SUMMARY OF THE INVENTION

It is accordingly a first object of the present invention to provide a telephone which readily and accurately perform setting and updating of parameter information, an ID code and control data on a remote control basis.

It is a second object of the present invention to provide a remote control system for telephones which readily and accurately performs setting and updating parameter information, ID codes and control data on a remote control basis.

To attain the first object, a telephone according to the present invention comprises information receiving means for receiving information including an instruction code, an ID code and either of system control data and parameter information every communication; instruction code storage means for storing at least first and second predetermined instruction codes; ID code storage means for storing an ID code for identifying the telephone; instruction-code discrimination means for comparing the instruction code received by the information receiving means with the first and second instruction codes stored in the instruction-code storage means to output a first control signal when the received instruction code corresponds to the first instruction code and a second control signal when the received instruction code corresponds to the second instruction code; ID code discriminating means for comparing the ID code received by the information receiving means with the ID code stored in the ID code storage means to output a ID-code coincidence signal when a coincidence occurs therebetween; system control data storage means responsive to the first control signal and the ID-code coincidence signal of storing the system control data received by the information receiving means; and parameter storage means responsive to the second control signal and the ID-code coincidence signal for storing the parameter information received by the information receiving means.

To attain the second object, a remote control system for telephones according to the present invention comprises an information transmitting section for transmitting information containing an instruction code, an ID code and either of system control data and parameter information every communication; and an information receiving section including information receiving means for receiving and temporarily storing the information from the information transmitting section; instruction code storage means for storing at least first and second predetermined instruction codes; ID code storage means for storing a ID code for identifying a telephone; instruction-code discrimination means for comparing the instruction code received by the information receiving means with the first and second instruction codes stored in the instruction-code storage means to output a first control signal when the received instruction code corresponds to the first instruction code and a second control signal when the received instruction code corresponds to the second instruction code; ID code discriminating mean for comparing the ID code received by the information receiving means with the ID code stored in said ID code storage means to output an ID-code coincidence signal when a coincidence occurs therebetween; system control data storage means responsive to the first control signal and the ID-code coincidence signal for storing the system control data received by the information receiving means; and parameter storage means responsive to the second control signal and the ID-code coincidence signal for storing the parameter information received by the information receiving means.

BRIEF DESCRIPTION OF THE DRAWINGS

The objects and features of the invention may be understood with reference to the following detailed description of an illustrative embodiment of the invention, taken together with the accompanying drawings in which.

DETAILED DESCRIPTION OF THE PREFERRED EMBODIMENTS

Figures 1, 2A, 2B, 2C:
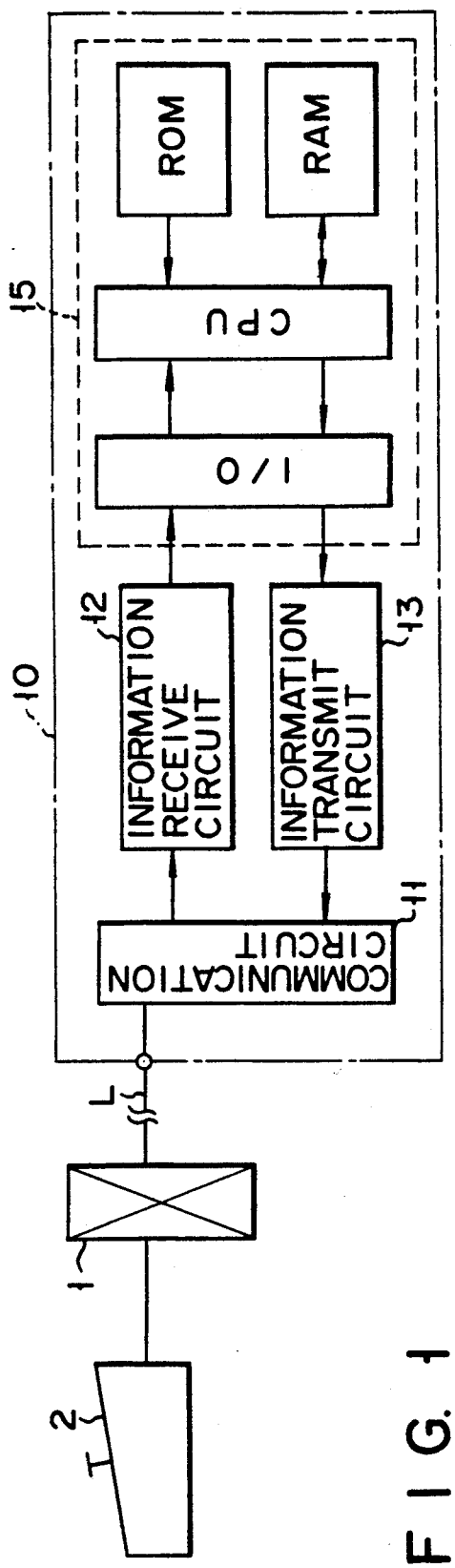
FIG. 1 is a block diagram of an embodiment of the present invention.
FIGS. 2A to 2C illustrate different formats of receive data.

Referring now to FIG. 1, which is primarily a block diagram of a public telephone 10 according to the present invention, an exchange 1 is connected via a telephone line L to a communication circuit 11 through which an information receive circuit 12 and an information transmit circuit 13 perform information communication with a public-telephone managing equipment 2.

Information with one of three types of data formats shown in FIGS. 2A to 2C is transmitted from managing equipment 2 to public telephone 10 via exchange 1. In the data format shown in FIG. 2A, an instruction code A1, an ID code and a new ID code are arranged in this order. In the data format shown in FIG. 2B, an instruction code A2, an ID code and system control data are arranged in this order. Furthermore, in FIG. 2C, an instruction code B, an ID code and parameter information are arranged in this order. After being temporarily stored in information receive circuit 12, such information is sent to a processor 15 formed of an input/output device I/O, a central processing unit CPU and storage devices ROM and RAM. On the other hand, transmit information for the managing equipment 2 is sent from processor 15 to information transmit circuit 13. A functional block diagram of processor 15 is illustrated in FIG. 3.

Figure 3:
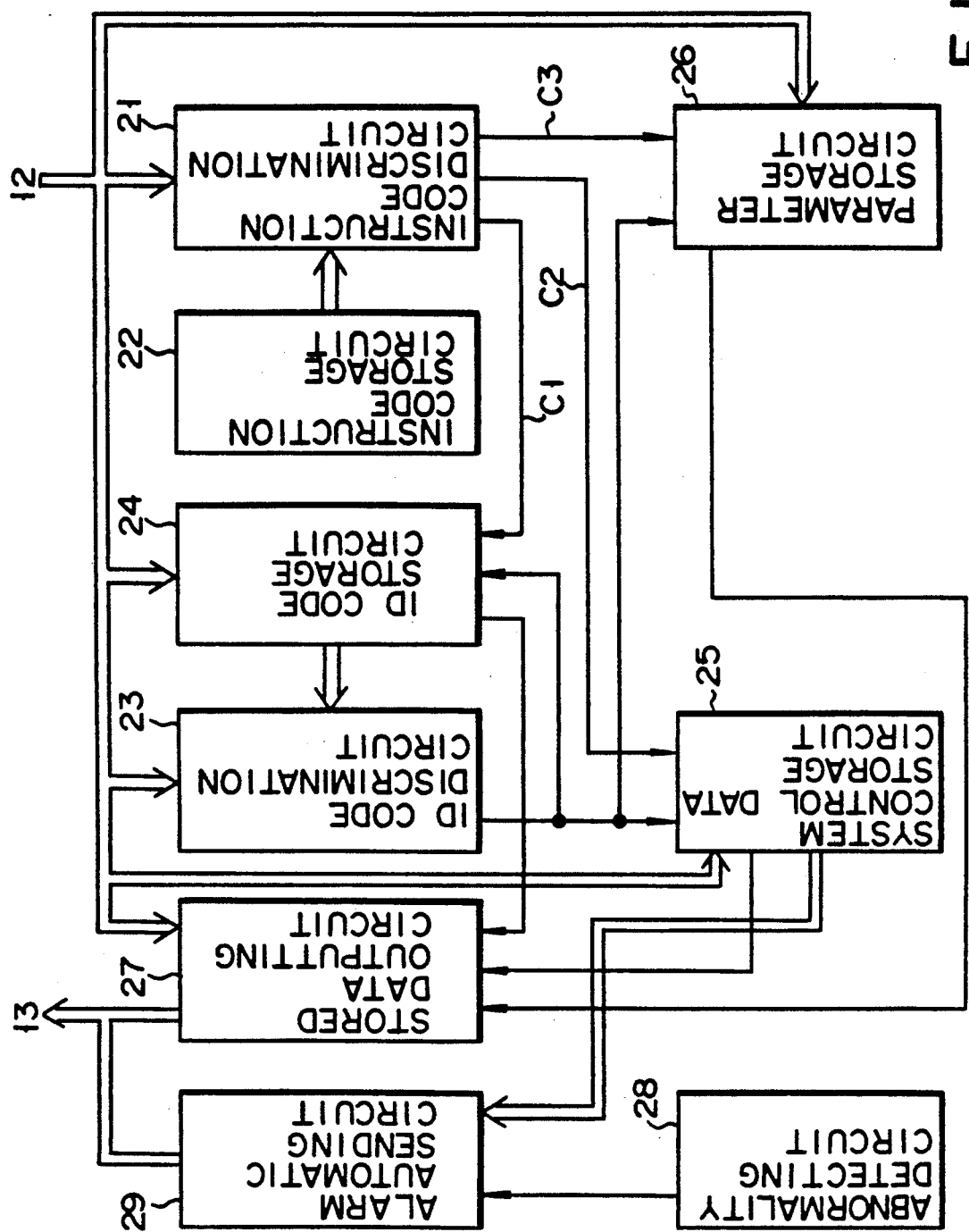
FIG. 3 is a functional block diagram of a principal part of FIG. 1.

In FIG. 3, an instruction-code discrimination circuit 21 compares the instruction code contained in receive information with three types of instruction codes A1, A2 and B previously stored in an instruction code memory 22 so as to provide one of control signals C1, C2 and C3 which correspond to codes A1, A2 and B, respectively. That is, when the instruction code A1 of FIG. 2A is received, control signal C1 is provided, while when the instruction code A2 of FIG. 2B is received, control signal C2 is output. Upon reception of the instruction code B of FIG. 2C, control signal C3 is produced. It is to be noted that instruction codes A1, A2 and B have been stored in storage device ROM or backup RAM before the installation of the public telephone. An ID code discrimination circuit 23 compares the ID code following the instruction code with an ID code stored in an ID code storage circuit 24 and then outputs an ID code coincidence signal when a coincidence occurs.

ID code storage circuit 24 stores an ID code transmitted from public-telephone managing equipment 2 together with instruction code A1 as the ID code information inherent in the public telephone when the public telephone is installed or the ID code is altered.

A system control data storage circuit 25 is responsive to control signal C2 from instruction-code discrimination circuit 21 and the ID-code coincidence signal from ID-code discrimination circuit 23 to store system control data (for example, the dial number of public-telephone managing equipment 2 for controlling the public telephone) received together with instruction code A2 and ID code information.

A parameter storage circuit 26 is responsive to control signal C3 from instruction-code discrimination circuit 21 and the ID-code coincidence signal from ID-code discrimination circuit 23 to store parameter information (for example, data on new telephone rate) received together with instruction code B and ID code.

In addition, ID-code storage circuit 24 is responsive to control signal C1 from instruction-code discrimination circuit 21 and the ID-code coincidence signal from ID-code discrimination circuit 23 to store a new ID code received together with instruction code A1 and ID code.

A stored-data output circuit 27 has a function of sending received information to information transmit circuit 13 and then returning it to public-telephone managing equipment 2 via communication circuit 11 while ID-code storage circuit 24, system control data storage circuit 25 and parameter storage circuit 26 store the received information.

An abnormality detecting circuit 28 is adapted to detect various types of abnormalities which may occur within the public telephone.

An automatic alarm sending circuit 29 is responsive to an abnormal detect signal from abnormality detecting circuit 28 to output the dial number of public-telephone managing equipment 2 stored in system control data storage circuit 25 and an alarm signal via information transmit circuit 13 and communication circuit 11.

Furthermore, according to another aspect of the present invention, the present invention can be said to be a remote control system for public telephones. A data block used for communication between the system and a public telephone includes parameters on telephone operations (for example, a rate parameter and a system control parameter), an ID code for each telephone, instruction codes for discriminating received parameters, information on telephone operating conditions and a cipher key. The ID code is checked against an ID code previously set within the telephone for primary true and false discrimination against the data block. Furthermore, a comparison is made between the received instruction code and a predetermined instruction code for secondary true and false discrimination of the data block.

The operation of the public telephone including communication circuit 11 will be described below with reference to the flowchart of FIG. 4.

First, a determination is made as to whether public telephone 10 is being used by a user or not and, when not used, a determination is then made as to whether information has been received from public-telephone managing equipment 2 or not (steps 1 and 2). If information starting with an instruction code as shown in FIG. 2A, 2B or 2C has been received from public-telephone managing equipment 2, the information is temporarily stored and then service interruption process is carried out to make impossible for general users to utilize public telephone 10 (steps 3 and 4). During the service interruption, a display is made to users by a lamp or the like to indicate that public telephone 10 cannot be utilized.

Next, the instruction code received and stored is compared with previously stored instruction codes A1, A2 or B (steps 5 to 7).

When it is determined that the instruction code is instruction code A1 in step 5, control signal C1 is output with the result that the received new ID code is stored in ID code storage circuit 24 and then sent back to public-telephone managing equipment 2 by stored-data outputting circuit 27 (step 8).

When it is determined that the received instruction code is A2 in step 6, control signal C2 is provided, whereby the received ID code is compared with the previously stored ID code and, upon determination of the occurrence of a coincidence therebetween, the system control data (for example, data on the dial number of public-telephone managing equipment 2 for controlling the public telephone) following the ID code is stored, which is sent back to public-telephone managing equipment 2 (steps 9 and 10).

When it is determined that the received instruction code is B in step 7, control signal C3 results so that testing is made for a determination of whether the received ID code coincides with the previously stored ID code or not and, when a coincidence occurs therebetween, the parameter information (for example, data on new telephone rate) received after the ID code is stored and returned back to public-telephone managing equipment 2 (steps 11 and 12).

If NO in step 7, then error processing is performed in step 13 and the operation then proceeds to step 14.

After such pieces of information have been stored, the service interruption process is canceled so that public telephone 10 comes to operate on the basis of the newly stored information (step 14).

At the time of installation of a public telephone, therefore, if the inherent ID code assigned to the public telephone and system control data as well as a predetermined instruction code are transmitted from public-telephone managing equipment 2 to the public telephone, they will automatically be set in the public telephone.

Also, for updating of ID code and parameter information during normal service time, it is only required that new data be transmitted from public-telephone managing equipment 2 to a public telephone together with a predetermined instruction code.

At the time of setting and updating data, newly set data are returned back to public telephone managing equipment 2 by stored-data outputting circuit 27 and information transmit circuit 13. Hence, public telephone managing equipment 2 can always monitor the transmitted data and surely set the data in the telephone.

In case where abnormality occurs during service time of public telephone 10, public-telephone managing equipment 2 may be automatically called on the basis of the dial number stored in system control data storage circuit 25 so that it receives an alarm signal. Thus, public-telephone managing equipment 2 can easily be informed of the occurrence of the abnormality on the side of public telephone 10.

Figure 4:
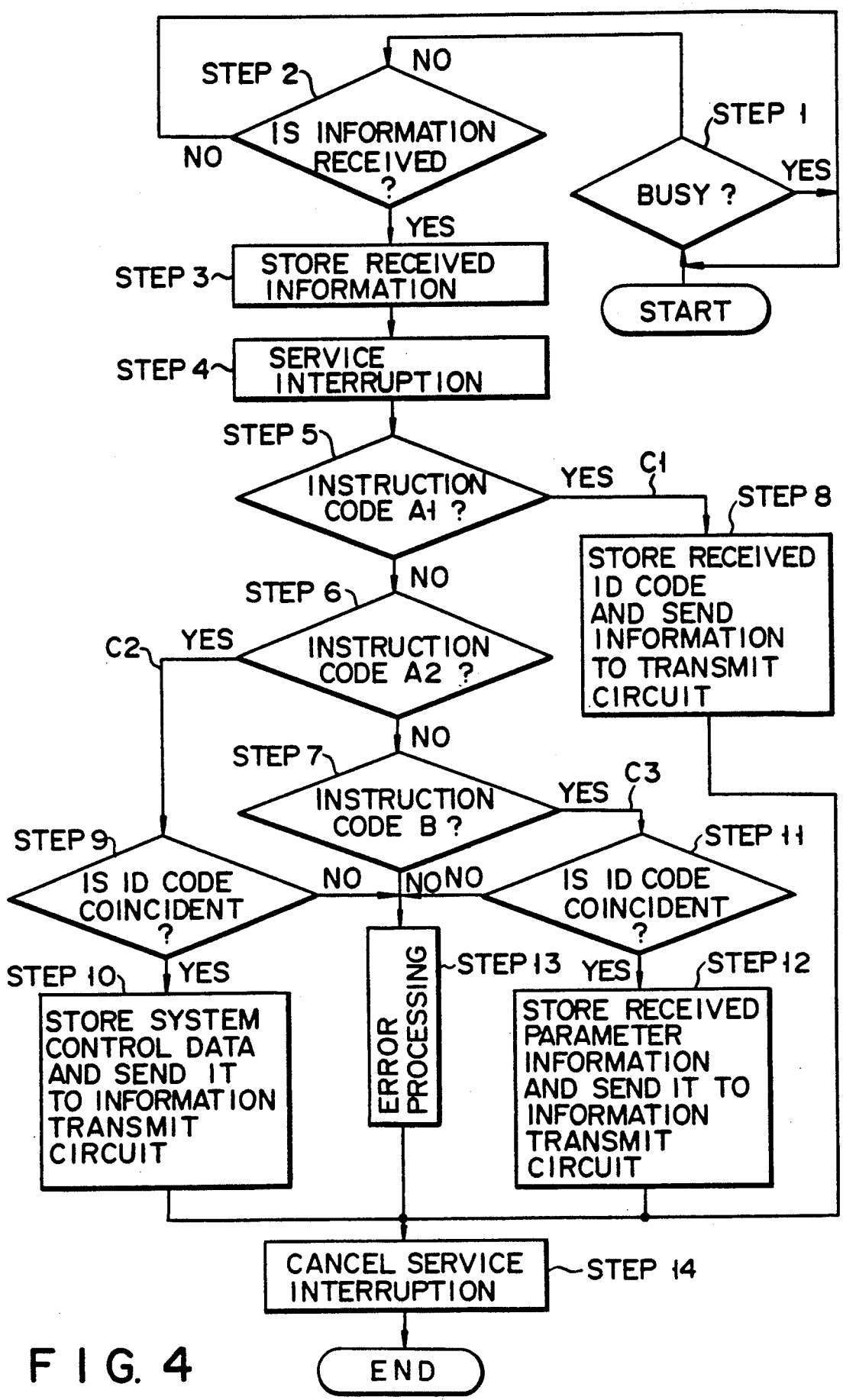
FIG. 4 is a flowchart of the processing procedure for received information.

In the above embodiment, a description is made of the case where information is transmitted from public-telephone managing equipment 2 in the order starting with an instruction code as shown in FIG. 4. However, the order of information for transmission may be arbitrary and, by way of example, an ID code may be transmitted first.

Further, ciphering and deciphering circuits may be provided in information transmit circuit 13 and information receive circuit 12, respectively, so that data security can be enhanced.

As described above, in the present invention, system control data or parameter information is automatically set in a public telephone through a line in accordance with a type of instruction code. At the time of installation of a public telephone as well, therefore, opening of the telephone is not required to set data. This can make the work for installation easy and prevent the failure of the telephone beforehand.

Furthermore, the present invention is characterized in (1) that the data formats of data blocks are different for each communication, (2) that the ID code can be changed at any time from the supervisory control center and (3) that original data can be ciphered by connecting ciphering and deciphering circuits (not shown) to the circuit arrangement of the present invention. The arbitrary combination of the above three features will not allow a third party to know the communication protocol for the purpose of unlawful utilization of public telephones.

What is claimed is:

1. A telephone comprising:
   information receiving means for receiving information including an instruction code, an ID code and one of system control data and parameter information upon a first communication between the telephone and outside managing equipment;
   instruction code storage means for storing at least first and second predetermined instruction codes;
   ID code storage means for storing an ID code for identifying the telephone;
   instruction-code discrimination means for comparing an instruction code received by said information receiving means from the outside managing equipment with said first and second instruction codes stored in said instruction-code storage means, for outputting a first control signal when the received instruction code corresponds to said first instruction code, and for outputting a second control signal when the received instruction code corresponds to said second instruction code;
   ID code discriminating means for comparing an ID code received by said information receiving means from the outside managing equipment with said ID code stored in said ID code storage means to output an ID-code coincidence signal when a coincidence occurs therebetween;
   system control data storage means responsive to said first control signal and said ID-code coincidence signal both being present for storing system control data received by said information receiving means from the outside managing equipment; and
   parameter storage means responsive to said second control signal and said ID-code coincidence signal both being present for storing parameter information received by said information receiving means form the outside managing equipment.

2. The telephone according to claim 1, in which said information included an instruction code and a new ID code upon a second communication between the telephone and the managing equipment, said instruction code storage means has means for storing a third predetermined instruction code, said instruction code discriminating means compares the instruction code received upon the second communication with said third predetermined instruction code to output a third control signal upon the occurrence of a coincidence therebetween, and said ID code storage means stores said new ID code in response to said third control signal and said ID-code coincidence signal output from said ID code discriminating means.

3. The telephone according to claim 2, further comprising stored-data outputting means for receiving and outputting one of the newly stored ID code, the system control data, and the parameter information each communication.

4. The telephone according to claim 3, further comprising information transmitting means for temporarily storing and transmitting an output of said stored-data outputting means.

5. The telephone according to claim 1, further comprising abnormality detecting means for detecting the abnormal state of said telephoen to provide a detect signal.

6. The telephone according to claim 5, in which said system control data includes a telephone number and there is further provided means responsive to the detect signal from said abnormality detecting means for outputting the telephone number and an alarm signal for informing the abnormality.

7. The telephone according to claim 1, in which said received information is arranged in the order of the instruction code and the ID code.

8. The telephone according to claim 1, in which said received information is arranged in the order of the ID code and the instruction code.

9. A remote control system for telephone, comprising:
   an information transmitting section for transmitting information containing an instruction code, an ID code and one of system control data and parameter information upon a first communication between the transmitter section and each of a number of remote telephones; and
   each of the remote telephones including
   an information receiving section including information receiving means for receiving and temporarily storing the information from said information transmitting section;
   instruction code storage means for storing at least first and second predetermined instruction codes;
   ID code storage means for storing an ID code for identifying the telephone;
   instruction-code discrimination means for comparing an instruction code received by said information receiving means from the transmitting section with said first and second instruction codes stored in said instruction-code storage means, for outputting a first control signal when the received instruction code corresponds to said first instruction code and for outputting a second control signal when the received instruction code corresponds to said second instruction code;
   ID code discriminating means for comparing an ID code received by said information receiving means from the transmitting section with said ID code stored in said ID code storage means to output an ID-code coincidence signal when a coincidence occurs therebetween;
   system control data storage means responsive to said first control signal and said ID-code coincidence signal both being present for storing system control data received by said information receiving means from the transmitting section; and
   parameter storage means responsive to said second control signal and said ID-code coincidence signal both being present for storing parameter information received by said information receiving means from the transmitting section.

10. The remote control system according to claim 9, in which said information includes an instruction code and a new ID code upon a second communication between each of the remote telephones and the transmitting section, said instruction-code storage means has means for storing a third predetermined instruction code, said instruction-code discriminating means compares the instruction code received upon the second communication with said third predetermined instruction code to output a third control signal upon the occurrence of a coincidence therebetween, and said ID code storage means stores said new ID code in response to said third control signal and said ID-code coincidence signal output form said ID code discriminating means.

11. The remote control system according to claim 9, further comprising stored-data outputting means for receiving and outputting one of a newly stored ID code, system control data and parameter information upon each communication.

12. The remote control system according to claim 11, further comprising information transmitting means for temporarily storing an output of said stored data outputting means.

13. The remote control system according to claim 9, further comprising abnormality detecting means for detecting an abnormal state of said telephone to provide a detect signal.

14. The remote control system according to claim 13, in which said system control data includes a telephone number and there is further provided means responsive to the detect signal from said abnormality detecting means for outputting the telephone number and an alarm signal for informing the abnormality.

15. The remote control system according to claim 9, in which said received information is arranged in the order of the instruction code and the ID code.

16. The remote control system according to claim 9, in which said received information is arranged in the order of the ID code and the instruction code.

* * * * *

UNITED STATES PATENT AND TRADEMARK OFFICE
CERTIFICATE OF CORRECTION

PATENT NO. : 5,020,097
DATED : May 28, 1991
INVENTOR(S) : TANAKA et al

It is certified that error appears in the above-identified patent and that said Letters Patent is hereby corrected as shown below:

On the title page, under Section [56] References Cited, insert the following:

U.S. PATENT DOCUMENTS -

--4,039,768   8/1977   O'Maley--

FOREIGN PATENT DOCUMENTS -

--62-1352   1/1987   Japan--

Signed and Sealed this

Fourth Day of May, 1993

Attest:

MICHAEL K. KIRK

Attesting Officer

Acting Commissioner of Patents and Trademarks